US010243192B2

United States Patent
Casebolt et al.

(10) Patent No.: US 10,243,192 B2
(45) Date of Patent: Mar. 26, 2019

(54) MODULAR BATTERY CASE FOR PRISMATIC CELLS AND PORTABLE OFF-GRID POWER STORAGE AND DELIVERY SYSTEM

(71) Applicant: Bren-Tronics, Inc., Commack, NY (US)

(72) Inventors: Richard Casebolt, Holbrook, NY (US); Richard Cecchini, Huntington Station, NY (US); Alan Squillante, Kings Park, NY (US); Henry Paczkowski, Manhasset Hills, NY (US); Peter J. Burke, East Northport, NY (US); Sai Fung, Melville, NY (US)

(73) Assignee: Bren-Tronics, Inc., Commack, NY (US)

( * ) Notice: Subject to any disclaimer, the term of this patent is extended or adjusted under 35 U.S.C. 154(b) by 205 days.

(21) Appl. No.: 15/260,098

(22) Filed: Sep. 8, 2016

(65) Prior Publication Data

US 2017/0069900 A1    Mar. 9, 2017

Related U.S. Application Data

(60) Provisional application No. 62/216,009, filed on Sep. 9, 2015.

(51) Int. Cl.
*H01M 2/20* (2006.01)
*H01M 2/10* (2006.01)
(Continued)

(52) U.S. Cl.
CPC ......... *H01M 2/206* (2013.01); *H01M 2/1077* (2013.01); *H01M 2/348* (2013.01); *H01M 10/482* (2013.01); *H01M 10/486* (2013.01); *H01M 10/488* (2013.01); *H02J 7/0052* (2013.01); *H04Q 9/00* (2013.01); *H01M 2010/4271* (2013.01); *H01M 2010/4278* (2013.01); *H01M 2220/10* (2013.01);
(Continued)

(58) Field of Classification Search
CPC .... H01M 2/206; H01M 2/348; H01M 10/482; H01M 2/1077; H01M 10/486; H01M 10/488; H01M 2010/4271; H01M 2010/4278; H01M 2220/10; H04Q 9/00; H02J 7/0052; H02J 7/14; H02J 7/345; H02J 2007/0059
See application file for complete search history.

(56) References Cited

U.S. PATENT DOCUMENTS 4,959,764 A    9/1990 Bassett
5,325,283 A    6/1994 Farrington et al.
(Continued)

*Primary Examiner* — Lisa S Park
(74) *Attorney, Agent, or Firm* — Keusey & Associates, P.C.

(57) ABSTRACT

A modular case having similarly sized U-shaped sections that enclose energy storage cells and a battery management system. Additional modules can be ganged together to increase the energy storage and output capacity. Removable panels in the sections can be removed for the installation of jacks and a status display. Various charging sources can be coupled to the module including solar, generator and AC mains for charging. An output switch selectively delivers AC mains power when available, and then switches to battery power during periods of AC mains unavailability.

22 Claims, 3 Drawing Sheets

(51) Int. Cl.
  *H01M 10/48* (2006.01)
  *H02J 7/00* (2006.01)
  *H01M 2/34* (2006.01)
  *H04Q 9/00* (2006.01)
  *H01M 10/42* (2006.01)
  *H02J 7/14* (2006.01)
  *H02J 7/34* (2006.01)

(52) U.S. Cl.
  CPC ............... *H02J 7/14* (2013.01); *H02J 7/345* (2013.01); *H02J 2007/0059* (2013.01)

(56) References Cited

U.S. PATENT DOCUMENTS

| | | |
|---|---|---|
| 6,069,803 A | 5/2000 | Cross |
| 6,370,050 B1 | 4/2002 | Peng et al. |
| 7,193,392 B2 | 3/2007 | King et al. |
| 8,530,069 B2 | 9/2013 | Wood et al. |
| 8,749,995 B2 | 6/2014 | Frattini et al. |
| 9,054,400 B2 | 6/2015 | Shiraishi et al. |
| 9,142,979 B2 | 9/2015 | Tsai |
| 9,172,257 B2 | 10/2015 | Touzani et al. |
| 2007/0188130 A1* | 8/2007 | Scheucher ............... B60L 8/00 320/110 |
| 2008/0278115 A1* | 11/2008 | Huggins ................ B60L 3/12 320/134 |
| 2008/0318119 A1* | 12/2008 | Watanabe ........... B60L 11/1874 429/99 |
| 2009/0206657 A1 | 8/2009 | Vuk |
| 2011/0006046 A1* | 1/2011 | Albrecht .............. B23K 9/1006 219/133 |
| 2011/0165451 A1* | 7/2011 | Kim ................... H01M 2/1077 429/153 |
| 2012/0242144 A1* | 9/2012 | Chorian ................ H01M 2/34 307/9.1 |

\* cited by examiner

MODULAR BATTERY CASE FOR PRISMATIC CELLS AND PORTABLE OFF-GRID POWER STORAGE AND DELIVERY SYSTEM

CROSS-REFERENCE TO RELATED APPLICATIONS

This application claims the benefit under 35 U.S.C. § 119(e) from U.S. Provisional Patent Application No. 62/216,009 entitled Modular Battery Case for Prismatic Cells and Portable Off-Grid Power Storage and Delivery System filed on Sep. 9, 2015.

BACKGROUND OF THE INVENTION

1. Field of the Invention

The invention relates to a modular battery case for prismatic cells and a battery management system. In addition, the invention relates to an energy conversion/storage system that converts DC power from various sources, stores the power, and delivers AC power.

2. The Prior Art

Previously, lead acid batteries were used in high current applications or other situation requiring robust secondary batteries. These batteries are heavy and contain environmentally damaging compounds.

Battery chemistry has been improved through the use of Lithium Ion (Li-Ion) cells. However, many Li-Ion cells need to be bundled together to provide a battery with the required power capacity. As the number of prismatic Li-Ion cells change to meet different requirements, manufacturers typically design a new case. Accordingly, each different battery has its own customized case.

A prior art example of a battery module is disclosed in U.S. Pat. No. 8,530,069 where cylindrical cells are packed into an upper tray and a differently configured lower tray. The cells are retained in sockets with bus bars coupling the cells together at the top. Wires extend out of the housing to external sensors. The prior art patent does not provide control electronics within the housing.

Accordingly, it would be desirable to provide a modular battery case that can be expanded as the number of required cells increases.

A further aspect of the invention addresses the problem of providing AC mains power in locations where utility power is unavailable or interrupted. Prior art approaches include separate input/storage/output devices. The storage component may include lead-acid batteries that have limited operational lives. The various components need to be integrated and installed which is costly and may result in safety issues.

Accordingly it would be desirable to provide an integrated system with increased safety, functionality and reliability. In addition, it would be useful for the system to include a battery management system, system control and communication and the ability to receiving charging power from a variety of sources.

SUMMARY OF THE INVENTION

It is one object of the present invention to provide a modular battery case in which additional modules can be ganged together to contain a larger number of prismatic cells.

It is a further object to configure each module with a top and bottom section with the prismatic cells and IC card containing the battery management system sandwiched therebetween.

It is another object to make the top and bottom sections as similar mating parts that can be produced with the same tool.

It is another object of the present invention to provide an integrated power conversion/storage/output system.

It is a further object to provide within the modular case an integrated system energy-storage media, a battery management subsystem including redundant safety features, and system control and communications.

It is another object to provide the power system with a single enclosure containing energy storage media, a battery management subsystem, and a DC/AC converter subsystem.

It is a further object to equip the system with an AC power switching subsystem to incorporate utility power if available.

These and other related objects are achieved according to an embodiment of the invention by providing a modular case to enclose prismatic cells and control electronics. The module has a first U-shaped section being upright to form a bottom half of the module and an equally sized second U-shaped section being inverted to form a top half of the module. Within the module is an internal module volume divided between a prismatic cell bay and a control electronics bay. A coupling rail is disposed at one end of the module to connect to a further module.

A battery management system is located within the control electronics bay and includes a charge control block for controlling the flow of current from external sources into said module. The battery management system also includes a DC to AC converter that controls the flow of power out of said module to provide mains AC power. The battery management system further includes a microcontroller that coordinates all the functions and features of the battery management system.

The modular case of claim 2, wherein The battery management system further includes a measurement and data acquisition sensor to monitor voltages, currents and temperatures of the prismatic cells. The microcontroller acquires, evaluates and responds to the monitored condition of the prismatic cells. A primary load controller operated by the microcontroller operates the DC to AC converter.

Each U-shaped section includes a prismatic cell rack disposed in the prismatic cell bay. Several series connected prismatic cells are mounted within the prismatic cell rack. The battery management system further includes a cell balancer for equalizing the cell voltages within the prismatic cells. In a practical application, the cell rack holds eight prismatic cells. The slots in the rack could be configured in many ways to hold more or less cells, or to hold larger or smaller dimensioned cells.

The first and second U-shaped sections have free ends that meet along a front and rear parting line. Rectilinear flanges are formed at the free ends that extend outwardly from the bays. Section fasteners are provided for securing the flanges together outside of internal module volume. Suitable section fasteners could be selected from screws, clips, clamps or nut/bolt sets. The module has a tubular shape with left and right edges. The coupling rail is structured as an annular flange at the edges that extends outwardly. Module fasteners connect the annular flange on one module to a further annular flange on another module outside of said internal module volume. Suitable module fasteners could be selected from screws, clips, clamps or nut/bolt sets.

The modular case further includes an end panel and end panel fasteners to connect the end panel to the annular flange. After the number of modules are selected and ganged, the two open ends are closed off with the end panels. Suitable end panel fasteners could be selected from screws, clips, clamps or nut/bolt sets. The various section, module and end panel fasteners could be customized different types of fasteners. For field operations, it would be preferable to have all fasteners be of the same type and interchangeable.

The modular case also includes electrical connectors to electrically couple the prismatic cells together, for example in a series connection. Fusible link wires electrically couple the cells from one module to the next. In one practical application of module-to-module connection, each cell was coupled to its corresponding cell in the adjacent module. In such a module-to-module connection the cells are connected in parallel.

The battery management system further includes an input AC power switch to selectively connect utility power when available to charge the prismatic cells. An output AC power switch selectively switches the module output power between prismatic cell power and utility mains power when available. An electrochemical circuit breaker is coupled to the prismatic cell output that trips upon sensing excessive current. The microcontroller independently trips the circuit breaker upon sensing abnormal operating conditions other than an over current condition. An AC output monitor is coupled to the DC to AC converter to receive a digital status signal from the DC to AC converter. The AC output monitor includes a communications link to report status information about the module's AC output. The communications link includes a wired communications link to report status to a local user. In addition, the communications link includes a wireless communications link to report status to remote technical support.

One or both of said U-shaped sections includes a removable panel to access the control electronics bay. A control panel is installed in the space provided by removing the removable panel. The control panel is coupled to the IC card and microcontroller to provide visual indicators of the battery management system status on the outside of the module.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF THE PREFERRED EMBODIMENTS

The invention relates to a modular case that encloses prismatic cells and a battery management system. The modular case is well suited for prismatic Li-Ion Cells. Various configurations of batteries require several different numbers of cells to produce the required voltage and capacity. There is a need to minimize tooling to produce cases that are able to provide support for a large number of combinations of cells. In addition, there is a need to provide portable battery power for mains AC devices in regions where no utility power exists, or the utility power is unreliable. By incorporating the battery management system within the modular battery case, one device can operate as a turnkey power storage and delivery system.

Many previous solutions require a new case for each change in the quantity of cells required to produce the specified voltage and capacity. The modular case will replace the current practice of designing a customized case each time the number of cells change.

Figure 1:
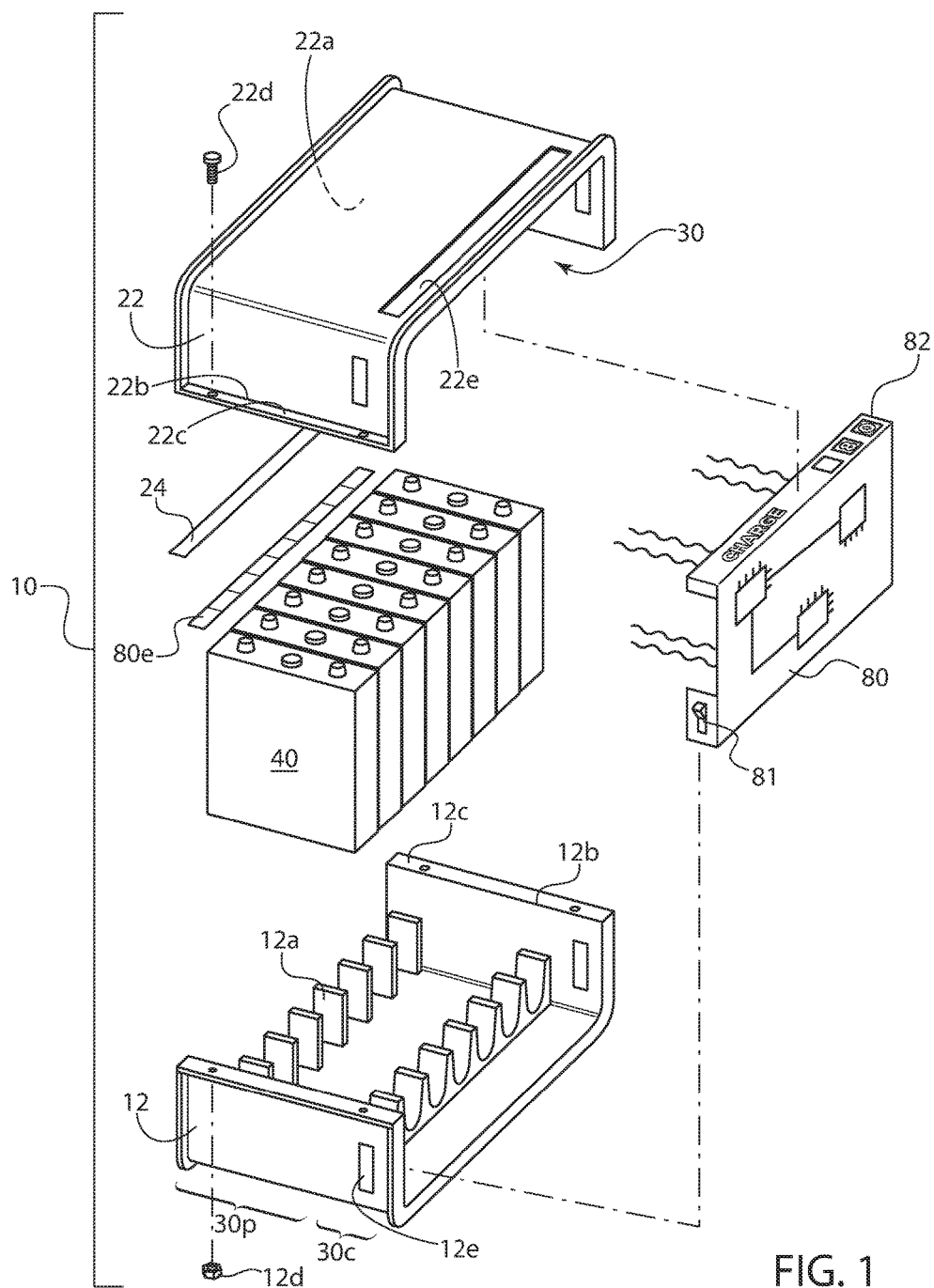
FIG. 1 is an exploded view of the sections for the modular case containing cells and a battery management IC card.

Referring now in detail to the drawings, and in particular FIG. 1, there is shown a modular case 10 that holds eight prismatic cells 40, for example. Case 10 is designed so that an additional module can be added to increase the capacity by specified increments. Each module consists of a top section and a bottom section. A first U-shaped section 12 is oriented upright to form the bottom half of module 10. A second U-shaped section 22 is inverted to form the top half of module 10. When coupled together the space within both U-shaped sections combine to form an internal volume 30. Internal volume 30 is divided between a prismatic cell bay 30p and a control electronic bay 30c. A prismatic cell rack 12a is disposed within prismatic cell bay 30p of first section 12. Though not shown, a similar prismatic cell rack 22a is disposed within second section 22. The upper prismatic cell rack 22a contains connectors 24 that connect to each cell forming a series arrangement of cells. While one connector 24 is shown, two or three connectors may be provided depending on the cells. A battery management control system 80, for example an IC Card, is disposed within the control electronics bay 30c. The battery control system includes a cell balancer 80e that is coupled to the cells, in between the cell contacts and the connector 24.

The top and bottom sections are built on the same tool. Two extremely similar, but different, sections are then clamped together with the cells inside to form one module. The cell racks may be integrally formed with the sections, for example, by injection molding. One or more removable blank panels 12e, 22e are provided in each section. In the embodiment of FIG. 1, panel 12e in bottom section 12 can be exchanged for an on/off switch 81 coupled to the IC card of battery management system 80. A further panel 22e in top section 22 can be exchanged for a control/connection panel 82 coupled to the IC card of battery management system 80. Various jacks for an external power source and supplied power may be provided within control/connection panel 80. Alternatively, jacks may be installed in other removable panels and operatively coupled to the battery management system via wire connections, as those shown extending off the back of battery management system 80. If additional capacity is needed, two additional sections are combined to form a further module which can be ganged to the first module. In this manner, the battery management system of the first module can be use to manage several banks of battery cells. In addition, the one set of jacks on the first module can function to recharge all ganged battery banks and draw power therefrom.

The top section is inverted and mounted to the bottom section with the cells, connectors and battery management system sandwiched therebetween. At the front end, the bottom and top sections have free ends 12b and 22b, from which flanges 12c and 22c, respectively, extend outwardly, away from the internal volume 30. Similar flanges extend off the back end of the section. The flanges are shown as rectilinear flanges that extend across the entire with of the module. The rectilinear flanges seal the free ends of the module and serve as stiffening ribs. Suitable fasteners 12d, 22d, for example, a nut and bolt or a screw, can be used to secure the flanges together without entering the internal cell storage area.

The IC card of the battery management system 80 is operatively connected to the individual cells 40 and connectors 24a, 24b. On the input side, system 80 receives charging power though a charging jack and routes it through connectors 24a,b to charge the cells. A cell balancer is connected to individual cells to draw power from excessively charged cells and apply it to weakly charged cells, so that all cells have approximately the same level of charge, output voltage, etc. The cell balancer may be coupled to the individual power cells, and located between the cells and the connectors. On the output side, system 80 receives power from connectors 24a,b and converts it to mains AC that is available at an output AC power jack. If AC Mains power is available it will be routed to the output AC power jack bypassing the cells which are then idled to conserve cell charge.

The sections are similarly sized and may include slight differences in their configuration. For example, the top section has a removable panel 22e for the control panel and modifications to the cell rack 22a to accommodate electrical connectors 24a,b. Bottom section may include removable panels for jacks and switches. The bottom section is configured to function as the bottom of the main module or an additional module. Similarly, the top section is configured to function as the top of the main module or an additional module. If only one module is needed, two end panels would be installed on the left and right sides.

Figure 2:
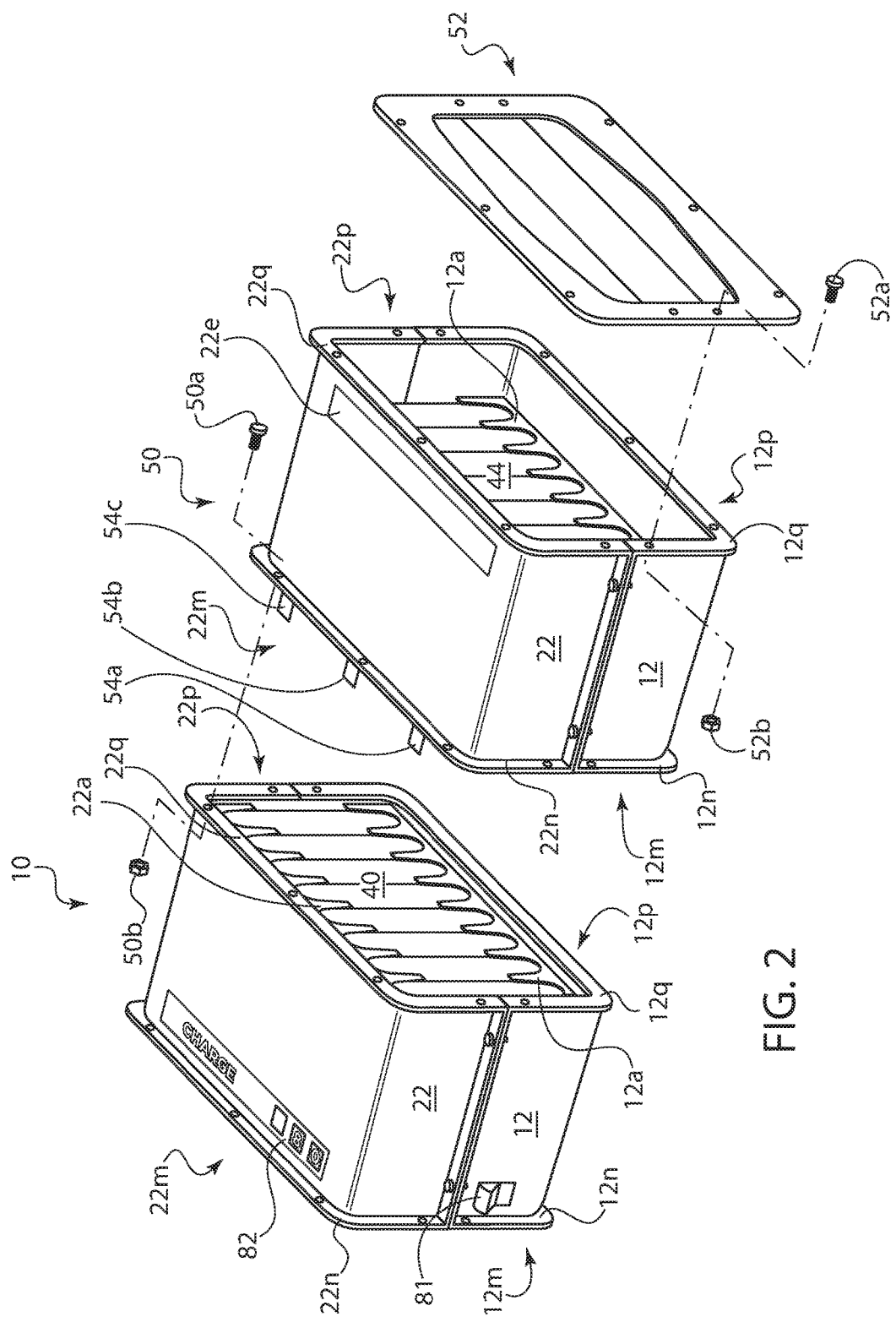
FIG. 2 is a perspective view showing two modules and an end panel for assembly.

As can be seen in FIG. 2 a further module 50 with secondary cell pack 44 can be ganged to primary module 10. Each module includes a left edge 12m,22m that is U-shaped, with an outwardly extending flange 12n, 22n. Flanges 12n, 22n collectively form a left side annular flange. Each module further includes a right edge 12p,22p that is U-shaped, with an outwardly extending flange 12q, 22q. Flanges 12q,22q collectively form a right side annular flange. While other suitable flange configurations may be used, the annular flange as illustrated serves to seal the modular case and function as a stiffening rib along the open free edges of the case.

In the basic configuration, module 10 would be sealed on both ends by an end panel 52 with end panel fasteners 52a,52b. If additional storage or power capacity is needed, a further module 50 may be ganged to module 10. Fusible link wires 54a,b,c are provided to couple the connectors 24 from both modules together. The fusible link wires are designed to blow and form an open circuit if excessive currents are present. Alternatively, the fusible link wires couple individual cells from one module to the next. This way the primary module 10 is protected from a fault occurring within the secondary module 50. While two modules are shown, additional modules may be ganged as required.

After the fusible link wires are installed, the modules are then mechanically coupled together. The right edge annular flange 12q, 22q of module 10 is coupled to left edge annular flange 12n,22n with module fasteners 50a,b. One end panel would then be installed on the left edge annular flange 12n,2n of module 10, and a further end panel would be installed on the right edge annular flange 12q,22a of module 50. Fasteners 50 and 52 may be screws or nuts and bolts. One battery management system may control an entire bank of ganged modules. The modular case is constructed from two equally sized sections. Each section comprises one half of the modular case. The section has outwardly-extending peripheral flanges that are symmetrically configured to form an invertible mirror image connecting rail for coupling sections and ganging modular cases together. The flanges comprise rectilinear flanges for coupling two sections together to form a modular case and annular flanges for ganging modular cases together. The rectilinear flanges are disposed at the front and back edges of the section, while the annular flanges are disposed at the left and right side edges of the section.

Battery management system may be programmed to provide different power profiles. In one application, system 80 includes components to convert DC power from various sources, and store power for future use in an advanced-design battery when no input power is available. The system is particularly suited to AC power with characteristics suitable for powering devices designed for utility mains AC power input.

There are many situations where the functions provided by utility-mains-powered devices are necessary and/or useful to maintain quality of life, but cannot be utilized for that purpose because utility mains power is either not available, or cannot be relied upon to be available when needed. Typical examples of such situations are underdeveloped, yet populated areas where utility-mains power has never been installed and would require highly-expensive/time-consuming infrastructure development to do so, areas where natural disaster/civil unrest/warfare severely limits the availability/reliability of utility-mains power, and areas of natural beauty where AC power is necessary for human comfort, but utility-mains infrastructure would significantly detract from the natural beauty and/or threaten the environment it exists within.

Known solutions include the combination of separate input/storage/output devices, utilizing legacy energy-storage components such as lead-acid batteries, that require the installation contractor or end-user to perform much/all of the system integration, and/or spend significant time and effort managing the system once it is operational. This often leads to unacceptable levels of reliability, while also raising significant concerns regarding electrical safety, as the contractors and users may not be educated about electricity and its safe use to the degree needed to successfully and safely integrate and operate these systems.

Also, these systems often have a limited operational life, due to the limits of the materials and methods used, and can become quite costly to rely upon for long-term use.

Some of the above also involve complicated methods that allow the AC output of the system to be connected to the utility-mains grid and allow the system to extract, store, and deliver energy from/to the utility grid. The economics of such systems compels their designs to accommodate relatively high power levels that drive up costs and render them non-cost-effective for many of the situations described in above, which do not need the high-power-delivery capabilities of the typical residential mains connection in the developed world.

The proposed solution meets the needs described above, while avoiding/mitigating the limitations of the known solutions described. It is designed primarily to function as an "off-grid" energy storage and delivery system, at power levels sufficient to support basic quality-of-life functions that require AC mains power, such as low-power refrigeration, high-efficiency lighting, cooling, computing/communications, and entertainment.

Figure 3:
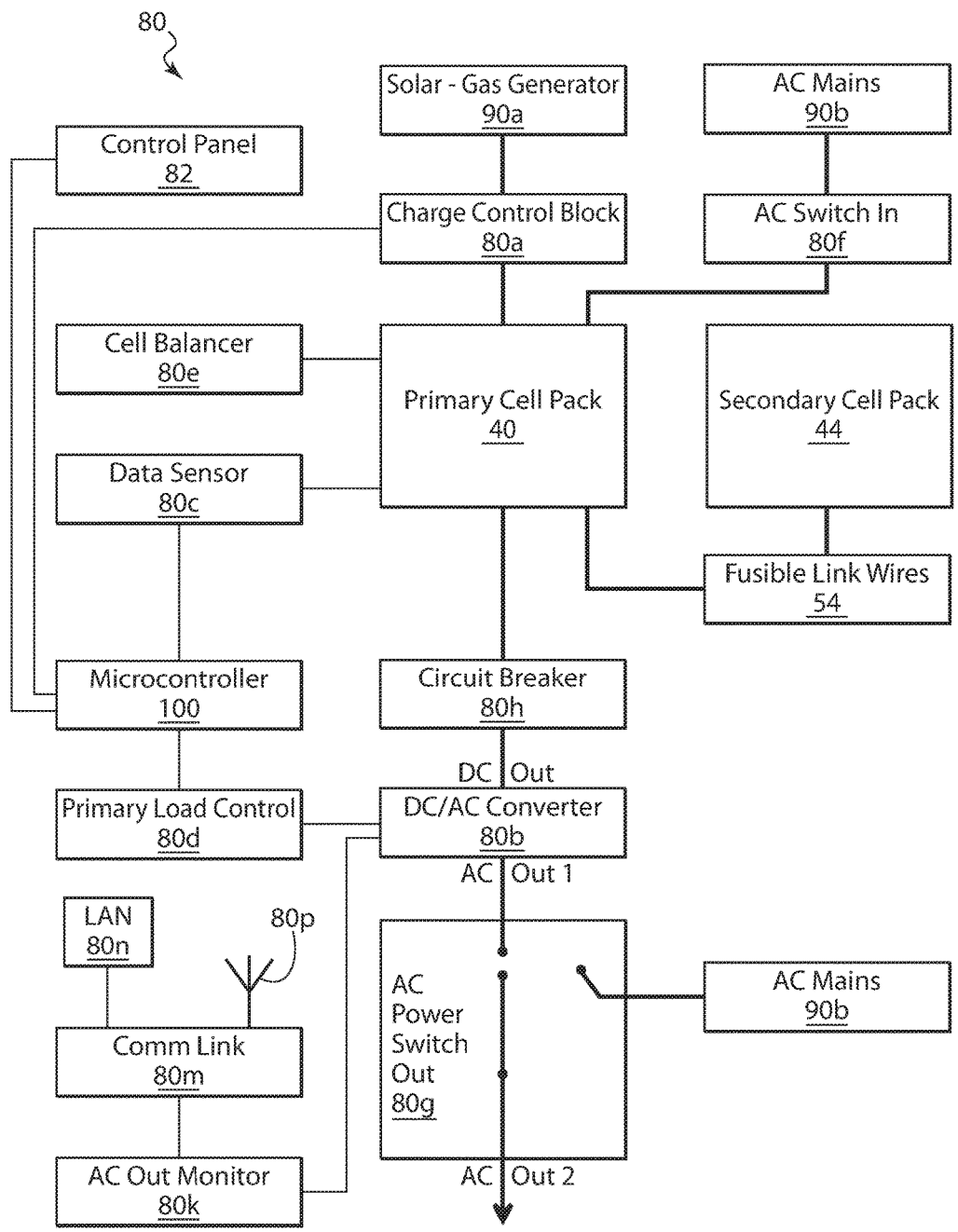
FIG. 3 is a diagram of the various components forming the battery management system.

Referring to FIG. 3, the schematic component diagram shows battery management system 80. An input jack fitted within one of the removable panels, or on control panel 82 is coupled to constant-current power sources, such as renewable-energy sources such as solar panels and current-limited DC power sources driven by an internal-combustion engine. The solar—gas generator source is designated by reference numeral 90*a*.

The energy-storage device is the primary component of the system. It contains the energy-storage media 40 but also containing management and protection electronics, as well as integral control mechanisms for both the charging process and the system's DC/AC power-conversion process. Concentrating these functions within the energy-storage device allows the remainder of the system to be implemented through the use of readily-available/cost-effective components and materials, and allow the design to use other components and materials that may provide more cost-effective performance in the future.

The system can also be equipped with a limited grid-connection capability that allows utility power to be automatically applied to the mains-powered functions above, while also storing energy from both the grid and off-grid sources, when utility power is available. The system is capable of automatically applying stored energy to the mains-powered functions when the utility power is not available, with no significant interruption in the operation of the mains-powered functions.

The system can be implemented in various configurations that provide varying levels of energy storage and/or AC power delivery capability. The physical size of the system will vary, based upon these parameters.

The preferred embodiment of the system, in all configurations, is a single enclosure that contains all system components except for input-power sources and mains-powered functions (except for the optional components that can charge the energy-storage device from the mains, which are internal to the enclosure).

Modular case 10 encloses prismatic cells 40 and battery management system 80. It may also enclose a DC/AC Converter Subsystem and an optional AC-Power switching Subsystem. The prismatic cells 40 or energy-storage media, in the preferred embodiment, takes the form of an array of electrochemical cells, in one or more series-connected cell strings. Regardless of the type, the energy-storage media is selected and configured to produce an overall voltage/current characteristic that leads to maximum power transfer from the constant-current charging sources, without requiring conversion of voltage/current/energy levels that are intrinsically available from those sources, while remaining compatible with the DC/AC conversion subsystem.

In some configurations the preferred embodiment incorporates multiple series strings that are parallel-connected to produce an array with the required level of energy storage. Where multiple parallel-connected strings are used, fusible-link wires are used to safely connect each cell in the string, to the cell in the same series position in the other string(s), to effectively form a single "cell" at each series position. In other words, the cells within each module are series connected, with the module-to-module connection being parallel. This facilitates the transfer of electrical charge between the cells at each series position, which in turn allows these cells to exhibit the same voltage. The fusible-link connection also allows use of a single connection from the battery-management system, at any series position, to monitor the voltage of all cells at that position. The use of fusible-link wires for these connections maintains pack safety in a more cost-effective manner than other methods; if a cell fails in a way that would produce an overcurrent condition in the other cells at the same series position, the fusible-link wire will melt and open the connection between the cells, interrupting the overcurrent condition and mitigating the risk of cell rupture and/or fire.

The battery management system continuously monitors voltage, current, and temperature conditions of the energy-storage media, to both ascertain the amount of energy stored in the media, and to detect/respond to conditions within the media that can degrade performance, operational life, and/or produce a safety hazard. This system includes the following functional blocks:

Embedded processing, in the form of one or more embedded microcontroller 100 integrated circuits (IC), to acquire, evaluate, and respond to the conditions of the energy-storage media, along with other components of the system.

Measurement and data acquisition sensor 80*c* monitors voltages, currents, and temperatures to ascertain energy-storage media conditions. This includes the ability to monitor the cell voltage and cell temperature at each series position in the cell string(s), through the use of a novel connection means that combines an electrical connection for the voltage measurement with a thermally-conductive/electrically-isolated connection for the temperature measurement.

A Cell-balancer 80*e* selectively applies resistive loads to discharge individual cells in response to cell-voltage measurement, in order to equalize the cell voltages all along the series string to maximize energy-storage capacity while keeping all cell voltages within their safe operating range. The cell-balancer may be a circuit directly connected to each cell in the module. The cell-balancer and other features may include MOSFETs or other battery management circuitry as disclosed in applicant's co-pending U.S. patent application Ser. No. 15/166,122, entitled Secondary Battery Housing with Control Electronics filed on May 26, 2016, the entire contents of which is incorporated herein by reference thereto.

An integral charge-control functional block 80*a* controls the flow of current from the external constant-current power sources 90*a* to the energy-storage media, in response to cell-voltage, source voltage and charge-current levels. The preferred implementation is a solid-state switch, under control of the embedded processing functional block supplemented by hardware-based protection circuitry, that provides ON/OFF control of the application of power directly from the external constant-current sources to the energy storage media, in a far simpler manner than earlier devices that use a voltage/current converter-regulator to transfer power from source to media. This takes advantage of the selection/configuration of the energy-storage media to produce an overall voltage/current characteristic that leads to maximum power transfer from the constant-current charging sources, without requiring conversion of voltage/current/energy levels that are intrinsically available from those sources. Charging power entering the charge control block would be applied to connectors 24 under operation of microcontroller 100.

A primary load-controller 80*d* operates a DC/AC converter 80*b*. Load controller 80*d* is controlled by microprocessor 100 to exercise on/off control in response to battery voltage and state-of-charge. This eliminates the need for high-current output-switching functionality within the battery, reducing parts count and cost while improving reliability.

Secondary protection, that is automatically activated when the energy-storage media is exposed to abnormal voltage/current/temperature levels and the charge-control and/or primary load control functions fail to prevent the exposure. In the preferred embodiment, this is accomplished through the use of an electromechanical circuit breaker 80*h* that can be tripped by either excessive current, or on command by the embedded processing system. Microprocessor 100 also utilizes this function to render the energy-storage subsystem permanently inoperative, if the energy-storage media has been exposed to conditions that would permanently damage the media and potentially render it unsafe for operation, by immediately tripping the circuit breaker 80*h* whenever it is manually closed.

Various System control and indication functions are integrated into the battery management system as follows.

A. A System ON/OFF switch (e.g. 81) input that is separate from the circuit breaker.

B. A monitor 80*k* of a digital signal, from the DC/AC conversion subsystem, that indicates a fault within that subsystem. In the preferred embodiment, this signal is also routed to an indicator, so that the user is informed of the fault.

C. An I/O support for means to display operational state at the system level. This could be as simple as an array of LED indicators, or as sophisticated as a ultra-low-power LCD display 82 that alphanumerically indicates operating status, that is back-lighted by LEDs of multiple colors that provide a gross indication of operating status to supplement the alphanumeric information.

D. Digital communications interface 80*m* that includes a basic serial interface, that supports both test/troubleshooting activities via connection to a computer via a LAN 80*n*. This could also be used to provide the alphanumeric data to the system display. Also, a wireless communications subsystem that supports remote status/trouble indication that is highly useful in managing large numbers of systems within a geographic area. In the preferred embodiment, this would take the form of a transceiver 80*p* that can access a cellular-data network.

Further included is a power supply and control circuit for one or more USB charging ports, that feed connectors on the exterior of the system, where the user can charge portable devices directly from the system. For example, control panel 82 may include USB charging ports, or charging ports may be installed in other removable panels on the module.

The DC/AC Converter 80*b* which operates as an inverter converts DC power from the energy-storage subsystem to AC power, at the desired voltage magnitude and frequency for use of mains-powered functions indigenous to a particular location. The preferred embodiment of this device is a solid-state converter utilizing semiconductor technology and mixed-signal control circuits.

This device accepts an ON/OFF control signal from the energy-storage subsystem, to allow that subsystem to turn on the device for use, turn the device off when not in use, turn off the device if the energy-storage media is depleted of energy, and/or turn off the device when voltages/currents/temperatures of the energy-storage media are outside the limits for safe and reliable operation.

This device includes protection circuitry to automatically limit and/or interrupt its output, if voltages/currents/temperatures within the subsystem move outside the limits of safe and reliable operation. This includes a digital signal output that is routed to the energy-storage subsystem and an external indicator, to signal when a fault has occurred/is occurring.

The AC-power switch 80*g* which is installed within the system enclosure includes a power entry module, and a power switch. The Power-entry module connects mains power 90*b* from outside the enclosure, to the other elements of this subsystem. In the preferred embodiment, it includes overcurrent protection. The AC Power-switch Out 80*g* includes a power-switching circuit, that is controlled by the energy-storage subsystem in response to the conditions of the mains waveform, to switch the power flow to the mains-powered devices connected to the system output.

When the utility-mains voltage is within the limits for safe and reliable operation of the mains-powered devices, the energy-storage subsystem directs this circuit to allow power to flow from the mains, instead of the DC/AC conversion subsystem, to conserve energy in the battery and/or reduce charging time.

When the utility-mains voltage is outside the limits, the energy-storage subsystem directs this circuit to allow power flow from the DC/AC conversion subsystem, to assure that the power to the mains-powered devices is always within the limits for safe and reliable operation. Stored prismatic cell power is routed from connector 24*s* through circuit breaker 80*h* to DC to AC Converter 80*b* and finally to AC Power Switch Out 80*g*.

An AC level-monitoring circuit, that transforms the utility-mains voltage to a safe level for input to the energy-storage subsystem, so that subsystem can monitor the voltage waveform of the utility mains.

The energy-storage subsystem uses a novel, software-based method to monitor this waveform and ascertain whether it is within the limits for safe and reliable operation, then respond and direct the AC power switching subsystem to transfer power flow to/from the DC/AC conversion subsystem output from/to the utility mains, with a time delay short enough to prevent the mains-powered devices from malfunctioning.

A constant-current/constant-voltage power source that is powered from the utility AC mains 90*b* and connected in parallel to the constant-current charging-power input 80*f*, to provide an additional source of charge current when the utility mains are available. In the preferred embodiment, this is implemented by re-purposing a power supply designed for powering LED lighting.

Having described preferred embodiments for (which are intended to be illustrative and not limiting), it is noted that modifications and variations can be made by persons skilled in the art in light of the above teachings. The sections 12 and 22 may be of various configurations while maintaining the key features of being sufficiently similar to manufacture on the same tool and provide the enclosing and ganging functionality. The flanges may be of alternate profiles while still allowing the sections to be coupled, and the modules to be ganged without encroaching on the internal volume of the case. The number and shape of the prismatic batteries can be varied depending on the power storage and output requirements. The battery control system may include selected blocks or all of the disclosed blocks depending on the application. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A modular case to enclose prismatic cells and control electronics comprising:
   a module having:
   a first U-shaped section being upright to form a bottom half of the module and an equally sized second U-shaped section being inverted to form a top half of the module, wherein said module has a tubular shape with left and right edges disposed at the two opposed open ends thereof;

an internal module volume divided between a prismatic cell bay adapted to receive prismatic cells and a control electronics bay; and a coupling rail disposed at said left and right edges of the module adapted to connect to one of a coupling rail of a further module or an end panel to close off the open ends.

2. The modular case of claim 1, further comprising a battery management system disposed within said control electronics bay including:

a charge control block for controlling the flow of current from external sources into said module;

a DC to AC converter that controls the flow of power out of said module to provide mains AC power; and a microcontroller that controls the battery management system.

3. The modular case of claim 2, wherein said battery management system further includes:

a measurement and data acquisition sensor adapted to monitor voltages, currents and temperatures of the prismatic cells;

said microcontroller acquires, evaluates and responds to the monitored condition of the prismatic cells; and a primary load controller operated by said microcontroller to operate said DC to AC converter.

4. The modular case of claim 3, wherein each U-shaped section includes a prismatic cell rack disposed in said prismatic cell bay;

wherein said module further includes a plurality of prismatic cells mounted within said prismatic cell rack; and said battery management system further includes a cell balancer for equalizing the cell voltages within said prismatic cells.

5. The modular case of claim 1, wherein said first and second U-shaped sections have:

free ends that meet along a front and rear parting line;

rectilinear flanges formed at said free ends that extend outwardly from said bays; and section fasteners for securing the flanges together outside of said internal module volume.

6. The modular case of claim 5, wherein said coupling rail comprises an annular flange at said edges that extends outwardly.

7. The modular case of claim 6, further including module fasteners adapted to connect said annular flange to a further annular flange outside of said internal module volume.

8. The modular case of claim 6, further including an end panel and end panel fasteners to connect said end panel to said annular flange.

9. The modular case of claim 4, further comprising electrical connectors to electrically couple said prismatic cells together.

10. The modular case of claim 9, further comprising fusible link wires to electrically couple the prismatic cells of one module to the prismatic cells of a further module.

11. The modular case of claim 10, wherein the fusible link wires electrically couple each prismatic cell of one module to the corresponding prismatic cell of the further module, so that the cells from one module are parallel connected to the cells from the further module.

12. The modular case of claim 4, further comprising fusible link wires to electrically couple each prismatic cell of one module to the corresponding prismatic cell of the further module.

13. The modular case of claim 4, wherein said battery management system further includes:

an input AC power switch to selectively connect utility power when available to charge said prismatic cells; and an output AC power switch to selectively switch the module output power between prismatic cell power and utility mains power when available.

14. The modular case of claim 4, wherein said battery management system includes:

a circuit breaker coupled to said prismatic cell output that trips upon sensing excessive current, wherein said microcontroller independently trips said circuit breaker upon sensing abnormal operating conditions.

15. The modular case of claim 4, wherein said battery management system includes:

an AC output monitor coupled to said DC to AC converter to receive a digital status signal from said DC to AC converter, said AC output monitor including a communications link to report status information about the module's AC output.

16. The modular case of claim 15, wherein said communications link includes a wired communications link to report status to a local user.

17. The modular case of claim 16, wherein said communications link includes a wireless communications link to report status to remote technical support.

18. The modular case of claim 1, wherein one of said U-shaped sections includes a removable panel to access said control electronics bay.

19. The modular case of claim 15, further including a control panel that is installed in the space provided by removing said removable panel, said control panel is coupled to said microcontroller to provide visual indicators of the battery management system status on the outside of said module.

20. The modular case of claim 1, wherein each section has outwardly-extending flanges that are symmetrically configured to form an invertible mirror image connecting rail for coupling sections together to form the modular case and for ganging multiple modular cases together.

21. The modular case of claim 20, wherein said flanges comprise rectilinear flanges for coupling two sections together to form a modular case.

22. The modular case of claim 21, wherein said flanges further comprise annular flanges for ganging together two modular cases.

* * * * *